United States Patent
Dillon

(10) Patent No.: US 9,290,278 B2
(45) Date of Patent: Mar. 22, 2016

(54) SYSTEMS AND METHODS FOR LAUNCHING SPACE VEHICLES

(71) Applicant: David G. Dillon, Minneapolis, MN (US)

(72) Inventor: David G. Dillon, Minneapolis, MN (US)

( * ) Notice: Subject to any disclaimer, the term of this patent is extended or adjusted under 35 U.S.C. 154(b) by 309 days.

(21) Appl. No.: 14/084,006

(22) Filed: Nov. 19, 2013

(65) Prior Publication Data

US 2015/0136913 A1      May 21, 2015

(51) Int. Cl.
| | | |
|---|---|---|
| *B64G 1/00* | (2006.01) | |
| *B64G 5/00* | (2006.01) | |
| *F42B 5/045* | (2006.01) | |
| *F42B 12/62* | (2006.01) | |
| *F41B 6/00* | (2006.01) | |
| *B64G 1/58* | (2006.01) | |

(52) U.S. Cl.
CPC  *B64G 1/002* (2013.01); *B64G 5/00* (2013.01); *F41B 6/00* (2013.01); *F41B 6/006* (2013.01); *F42B 5/045* (2013.01); *F42B 12/625* (2013.01); *B64G 1/58* (2013.01)

(58) Field of Classification Search
CPC .... B64G 1/002; B64G 1/64; B64G 2001/643; B64G 5/00; B64G 2005/005; B64C 2201/08; B64C 2201/084; B64F 1/04; B64F 1/06; B64F 1/10
USPC ............ 220/1.5, 62.11, 62.17, 62.15, 560.07, 220/560.11
See application file for complete search history.

(56) References Cited

U.S. PATENT DOCUMENTS

| | | | |
|---|---|---|---|
| 2,953,065 A * | 9/1960 | Brown ............................ | 244/63 |
| 3,731,893 A * | 5/1973 | Stalmach, Jr. ............. | 244/171.8 |
| 3,998,359 A * | 12/1976 | Pettit ................................. | 222/3 |
| 4,795,113 A * | 1/1989 | Minovitch ...................... | 244/63 |
| 4,881,446 A * | 11/1989 | Marks et al. ........................ | 89/8 |
| 5,024,137 A * | 6/1991 | Schroeder ........................... | 89/8 |
| 6,119,985 A * | 9/2000 | Clapp ..................... | B64C 39/02 244/135 R |
| 6,311,926 B1 * | 11/2001 | Powell et al. .................... | 244/63 |
| 7,444,919 B1 * | 11/2008 | Mansfield ............... | F41B 6/003 89/8 |
| 2006/0032986 A1 * | 2/2006 | Maker et al. ............... | 244/171.6 |
| 2011/0042521 A1 * | 2/2011 | Sample ...................... | 244/159.3 |
| 2012/0032029 A1 * | 2/2012 | Dee La Pena Llaca .... | 244/171.3 |
| 2012/0175457 A1 * | 7/2012 | Hunter ..................... | F41A 1/02 244/3.22 |
| 2015/0175278 A1 * | 6/2015 | Hunter .................. | B64G 1/002 244/158.5 |

FOREIGN PATENT DOCUMENTS

| | | | |
|---|---|---|---|
| DE | 38445852 | * | 1/1990 |
| JP | 2000203499 | * | 7/2000 |

OTHER PUBLICATIONS

Spaceport Visioning: Concept Study; Oct. 2002; National Aeronautics and Space Administration; Available online <http://science.ksc.nasa.gov/shuttle/nexgen/BiFrostMaglev.htm>.*
"Rocket Sled Launch", obtained from Wikipedia on Apr. 11, 2013.
"Space Elevator", obtained from Wikipedia on Apr. 11, 2013.

* cited by examiner

*Primary Examiner* — Tien Dinh
*Assistant Examiner* — Michael A Fabula
(74) *Attorney, Agent, or Firm* — Patent Portfolio Builders PLLC

(57) ABSTRACT

Systems and methods for launching space vehicles into orbit involve placing a space vehicle into a protective container. The protective container is placed on a sled in a maglev tunnel and then launched into the atmosphere. Once the protective container reaches a certain height the space vehicle is released from the protective container and the space vehicle then proceeds to the desired orbital position.

15 Claims, 7 Drawing Sheets

SYSTEMS AND METHODS FOR LAUNCHING SPACE VEHICLES

BACKGROUND OF THE INVENTION

Figure 2B:
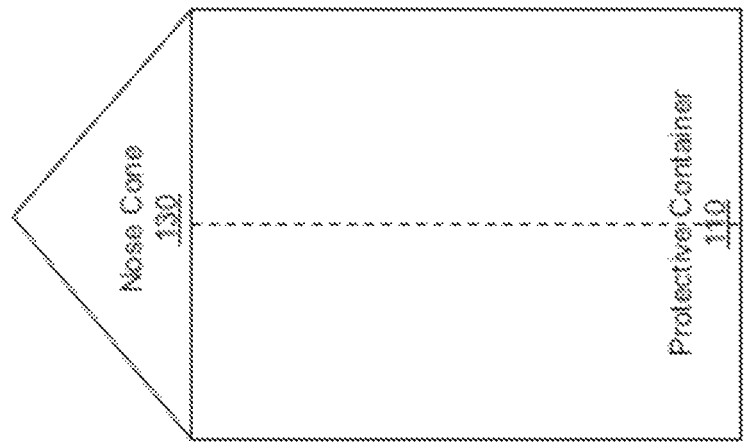

Existing technologies for launching space vehicles involve the use of booster rockets to deliver a space vehicle into orbit. In order to achieve the necessary velocity to place the space vehicle into orbit, the rocket requires a large amount of fuel, which results in a majority of the weight of the rocket being dedicated to the fuel rather than the space vehicle itself. Thus, space vehicles and materials for the rocket must be designed as lightweight as possible in order to minimize the amount of thrust required to liftoff and then achieve the necessary velocity to place the space vehicle into orbit. This requires the use of expensive lightweight materials and exotic designs, which in turn results in the space vehicle and rocket being extremely expensive and fragile.

A number of alternatives to the use of rockets have been proposed in order to launch space vehicles into orbit, however these alternatives are dependent upon engineering or material science that does not currently exist. One such alternative is a so-called "space elevator", which essentially involves a cable extending from an orbital position down to the earth's surface. A space vehicle would be attached to the cable and be carried into orbit on the cable. Currently there are no known materials for the cable that are strong and lightweight enough to withstand the earth's gravitational pull.

Another alternative is the use of magnetic levitation (maglev) train technology in connection with a so-called "rocket sled launch." In this alternative the space vehicle is placed on a sled that levitates over a magnetic rail track and the sled is propelled up to a certain speed (i.e., an economically meaningful portion of intended orbital velocity) and then launched from the sled into the lower atmosphere. The magnetic rail track can be designed so that it travels a certain vertical distance (e.g., up to 10,000 feet above the earth's surface) so that the space vehicle is released further into the atmosphere.

SUMMARY OF THE INVENTION

The use of maglev technology has a number of advantages, including the ability to increase the weight of the space vehicle because a large booster rocket is not necessary to bring the space vehicle up to the speeds necessary to propel it into orbit. Further, the maglev track and sled are reusable, whereas booster rockets typically are not.

One problem with the use of maglev technology is that space vehicle must reach higher speeds at lower altitudes compared to conventional rocket technology because the maglev track can only extend a limited distance from the earth's surface. For example, if the maglev track extended up to 12,000 feet from the earth's surface the space vehicle might have to reach four or five thousand miles per hour in order to have an economically useful impact on a heavy lift vehicle's capability to reach its orbital position. Traveling at these speeds so close to the earth would cause the space vehicle to burn-up as it attempts to pass through the earth's atmosphere.

Exemplary embodiments of the present invention are directed to methods and systems for launch vehicles using maglev technology. In accordance with exemplary embodiments of the present invention, the space vehicle or the space vehicle mounted within or on a rocket is encased in a heavy protective container while it is on the maglev sled. The heavy protective container protects the space vehicle and/or the rocket as it pierces the lower atmosphere and then the space vehicle and/or rocket can be released from the heavy protective container once it has passed the lower atmosphere where the atmospheric drag and heat from compression become relatively minor concerns to the integrity of the space vehicle and/or rocket.

Other objects, advantages and novel features of the present invention will become apparent from the following detailed description of the invention when considered in conjunction with the accompanying drawings.

BRIEF DESCRIPTION OF THE DRAWING FIGURES

Figure 2A:
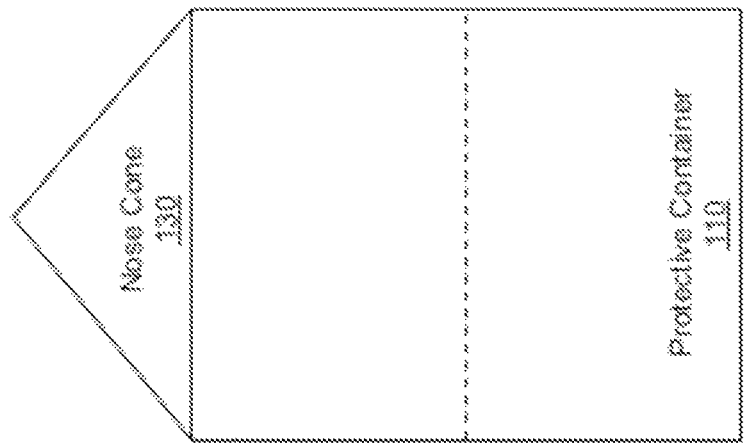
Figure 1:
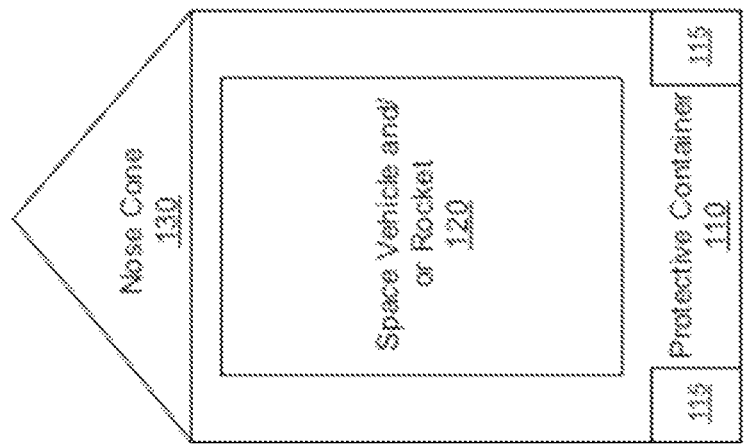
Figure 3A:
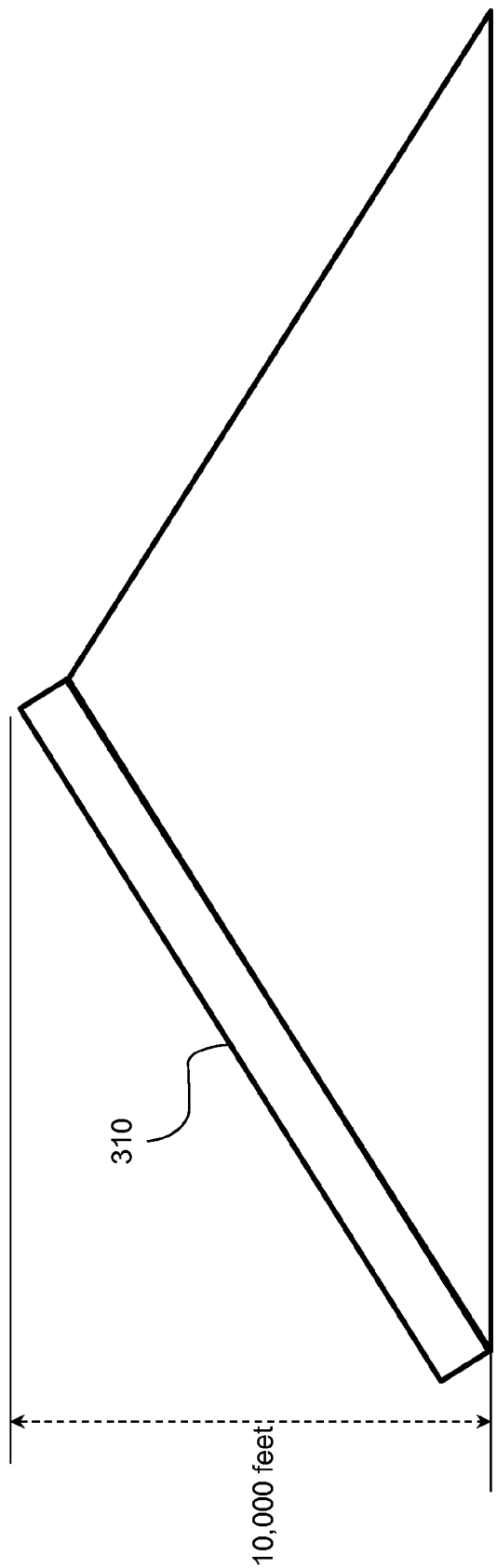
Figure 3B:
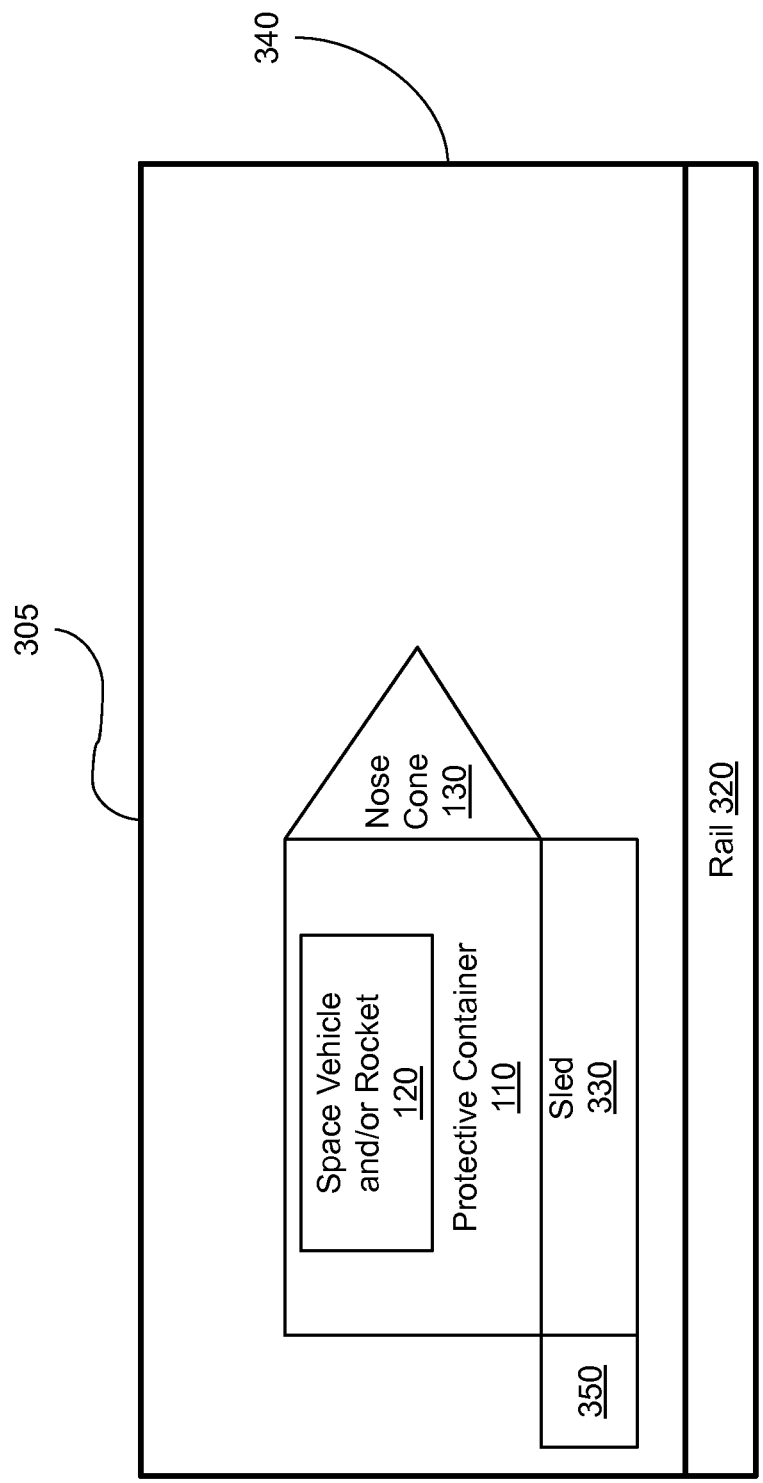
Figure 3C:
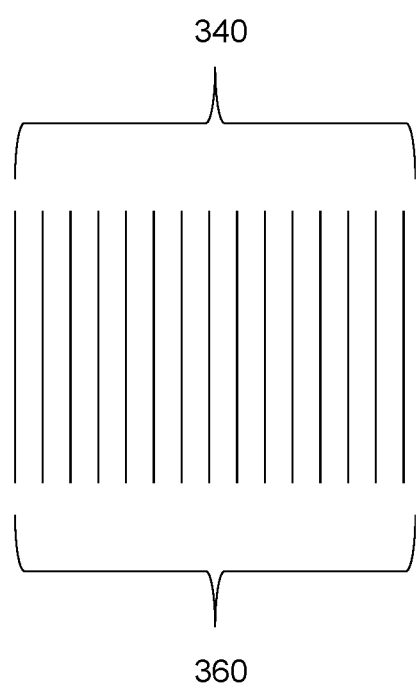
Figure 3D:
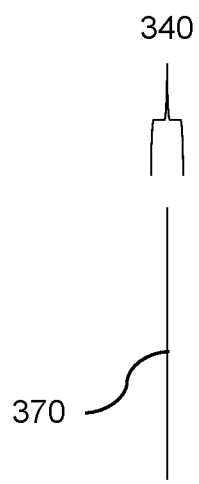
Figure 4:
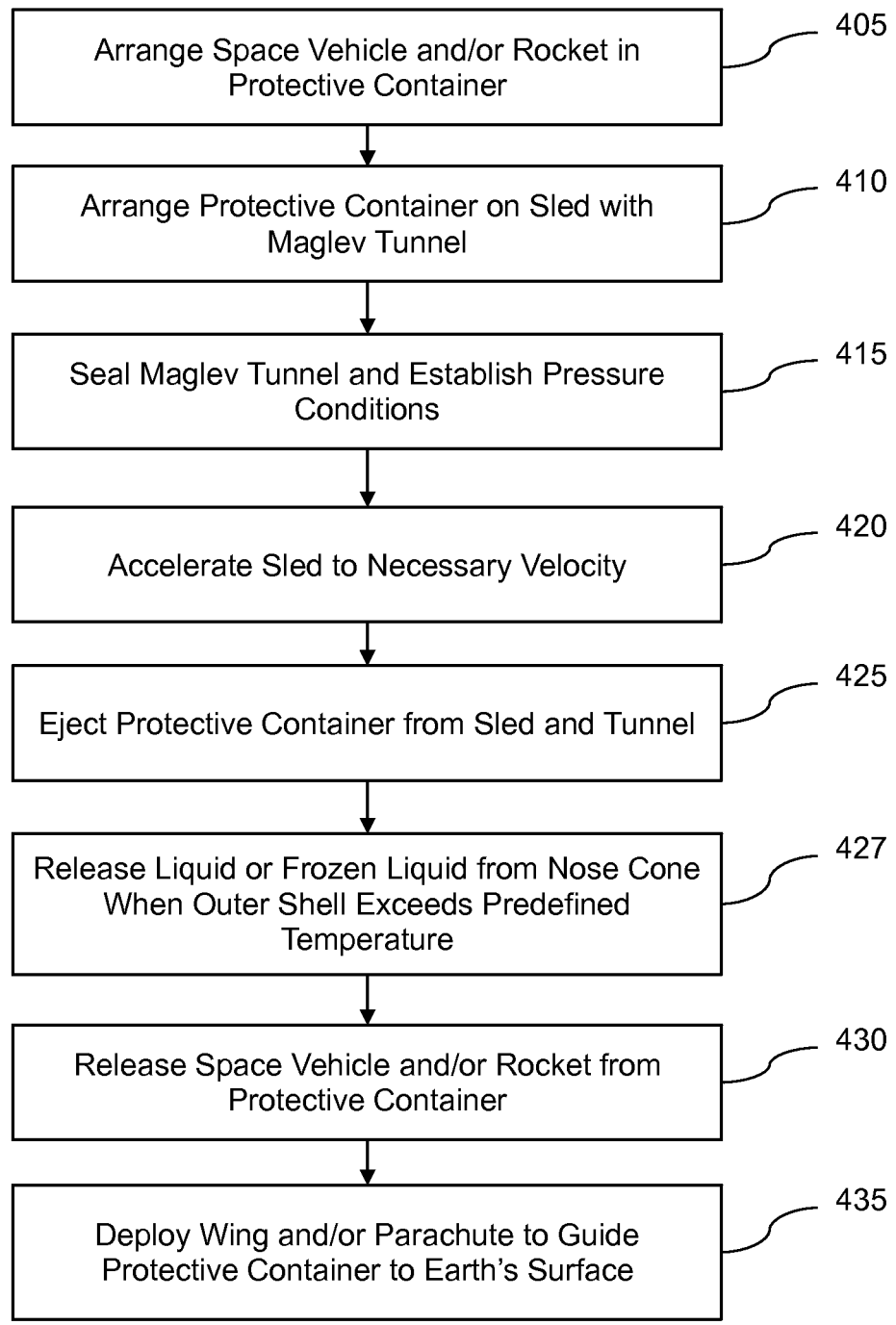
Figure 5B:
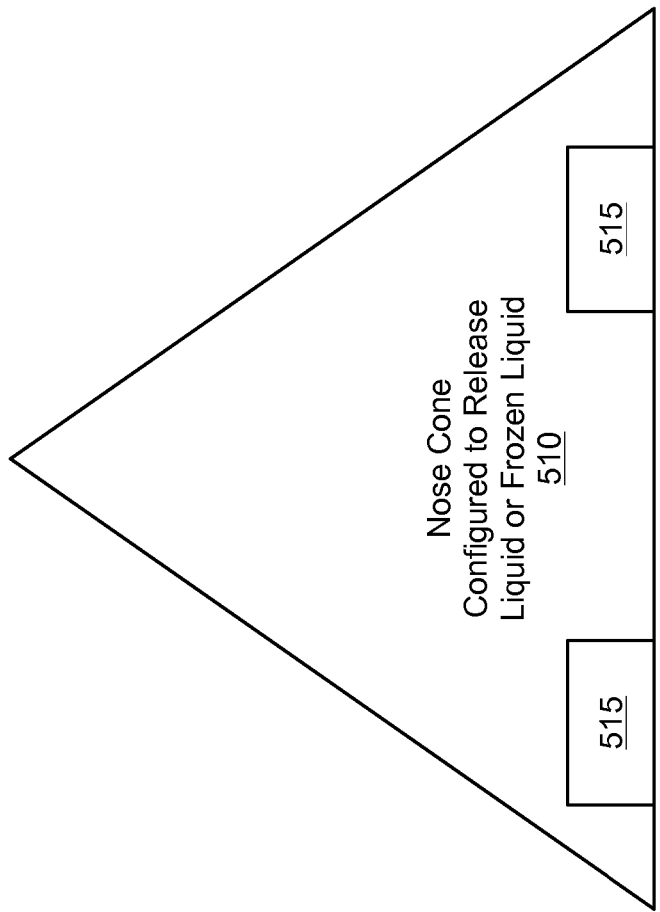
Figure 5A:
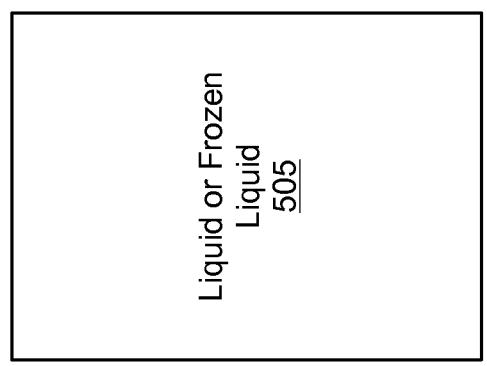

FIGS. 1, 2A, and 2B are block diagrams of exemplary protective containers in accordance with the present invention;

FIGS. 3A-3D are block diagrams of an exemplary system in accordance with the present invention; and FIG. 4 is a flow diagram of an exemplary method in accordance with the present invention; and, FIGS. 5A and 5B respectively illustrate a liquid or frozen liquid and a nose cone containing a liquid or frozen liquid in a highly schematic form.

DETAILED DESCRIPTION OF THE PREFERRED EMBODIMENTS

FIGS. 1, 2A, and 2B are block diagrams of exemplary protective containers in accordance with the present invention. The protective container 110 contains an inner space configured to hold a space vehicle and/or rocket 120, and includes an aerodynamic nose cone 130. The protective container also includes an outer shell configured to withstand atmospheric stresses (i.e., heat and pressure) as the protective container passes through the atmosphere. This outer shell can be made from any desired materials that can withstand the atmospheric stress. A particularly cost-effective material is steel. It should be noted that an advantage of this approach is that heavy weight, resulting from designs that maximize strength and reusability at low cost, is actually a positive attribute in piercing the lower atmosphere.

Although the figures illustrate a line between the nose cone 130 and the rest of the protective container 110, the nose cone 130 can be an integral component of the container or a separate component attached to the container. The nose cone 130 can be designed solely as an aerodynamic component of the protective container to reduce drag or can have additional functions. Further example, the nose cone 130 could contain a liquid or frozen liquid, which upon heating from atmospheric compression would be released to provide both cooling to the nose cone as well as additional thrust as the super heated gas escapes from nozzles arranged at the base of the nose cone. FIGS. 2A and 2B illustrate exemplary configurations for opening the protective container 110 to release the space vehicle and/or rocket 120, in FIG. 2A the container opens across its horizontal extent and in FIG. 2B the container opens across its vertical extent. The protective container 110 can be configured to have any type of mechanism for guiding it back to the earth's surface once it has released the space vehicle and/or rocket 120. For example, it could include deployable wings and/or parachutes 115, such as those employed in common drone guidance technologies. Further, the protective container 110 can include a thrust mechanism (not illustrated), such as a solid fuel booster rocket to offset speed reduction and negative acceleration from contact with the atmosphere. The thrust mechanism is preferably of a low cost design with emphasis on reusability not requiring a lightweight design.

FIGS. 3A-3C are block diagrams of an exemplary system in accordance with the present invention. FIG. 3A illustrates an exemplary system 310 built on an inclined surface so that the terminal end is 10,000 feet above the earth's surface. The inclined surface can be part of the earth's surface, such as a mountain, and/or a man-made structure. Although this figure illustrates the vertical distance from one end of the system 310 to the other end being 10,000 feet, the distance can be greater or less than this amount. For example, the system can be built in a high elevation portion of the earth's surface, such as in Colorado. Furthermore, the height elevation can be less than 10,000 feet from the earth's surface if the protective container 110 can be accelerated to the necessary velocity for the space vehicle, with additional propulsion as needed, to reach its orbital position in a shorter distance. In addition, the length of the system 310 can whatever length is sufficient and economical to account for needed acceleration and deceleration.

FIG. 3B illustrates the details of the system 310. Specifically, the system includes tunnel 305 housing a magnetic levitation rail 320, which produces a sufficient magnetic force to allow sled 330 to levitate above the rail 320. The sled 330 carries the protective container 110, which in turn carries the space vehicle and/or rocket 120. The sled 330 also includes a propulsion system 350, which produces the necessary acceleration to launch space vehicle into the desired orbital position. However, if the space vehicle is part of a rocket, which has its own propulsion system, the amount of acceleration required to be produced by propulsion system 350 can be reduced by the amount that can be produced by the rocket's own propulsion system. Further, if the protective container 110 includes its own acceleration mechanism, this can be accounted for when determining the necessary acceleration for the sled. Although FIG. 3B illustrates propulsion system being located in a particular position relative to the sled 330 and the protective container 110, this position is not critical and the propulsion system can be located in a different position.

In order to achieve the desired acceleration with a minimal amount of energy the tunnel 305 can be maintained so that the interior has vacuum or near-vacuum condition, which reduces the drag as the protective container moves through the tunnel 305. The end 340 of the tunnel 305 must be sealed in order to achieve these pressure conditions. In accordance with exemplary embodiments of the present invention, which are illustrated in FIG. 3C, the seal can be achieved using a number of lightweight films. The use of lightweight films allows the tunnel 305 to maintain the desired pressure while not significantly affecting the velocity of the protective container as it breaks through the end 340. If it is assumed that one of these lightweight films, such as a 3 millimeter polyester film, can safely hold a pressure of 1 PSI, then as illustrated in FIG. 3C fifteen films 360 can be combined at the end 340 of the tunnel 305 to safely hold a pressure of 15 PSI. The particular number and types of films can be selected based on the amount of pressure that any particular individual film can safely hold and the desired amount of total pressure that must be held. Although FIG. 3C illustrates spacing between the films, the films can be arranged to be directly adjacent to each other. Alternatively, the films can be spaced in such a manner to reduce transition shock to the protective container and the space vehicle and/or space vehicle and rocket 120. FIG. 3D illustrates a protective film 370 arranged at a terminal end 340 of the tunnel 305.

FIG. 4 is a flow diagram of an exemplary method in accordance with the present invention. The space vehicle and/or rocket 120 is arranged in the protective container 110 (step 405) and then the protective container 110 is arranged on a sled 330 in a tunnel 305 (step 410). The tunnel 305 is then sealed and the desired pressure conditions are established, for example by evacuating the air to establish vacuum or near-vacuum pressure conditions (step 415). The sled is then accelerated to the necessary velocity (step 420). The necessary velocity will depend on the overall weight of the protective container 110 and the space vehicle and/or rocket 120, the height from the earth's surface from which the protective container 110 exits the tunnel 305, the desired orbital position of the space vehicle 120, and whether the space vehicle and/or rocket 120 includes additional booster engines. Further, it should be recognized that the weight of the protective container 110 can provide the necessary momentum once the acceleration from the maglev system is lost at the end of the tunnel. In one exemplary embodiment the necessary velocity can be 10% of the orbital velocity of the space vehicle. One skilled in the art can calculate the necessary velocity using these and any other factors based on conventional equations, and thus such calculations are not discussed in further detailed.

When the sled 330 reaches the end of the tunnel 305 the protective container 110 is ejected from the sled 330 and tunnel 305 (step 425). It should be recognized that this can occur at the end of the tunnel 305 or at a point prior to the end of the tunnel. As discussed above, when the protective container 110 is ejected from the tunnel 305 it will pierce the film(s) 360 at the end 340 of the tunnel 305.

The space vehicle and/or rocket 120 will be released from the protective container once the protective container 110 reaches a certain height above the earth's surface (step 430). The height at which this occurs will depend upon a number of factors, including the overall weight of the protective container 110 and the space vehicle and/or rocket 120, the desired orbital position of the space vehicle 120, and whether the space vehicle and/or rocket 120 includes additional booster engines. In any case, this height should be at least high enough from the earth's surface so that the space vehicle and/or rocket 120 is released into a portion of the atmosphere that will not cause it to burn-up. Accordingly, this height can be adjusted, as desired, by providing additional shielding to the space vehicle and/or rocket 120, keeping in mind that the additional shielding will add weight that will require additional acceleration compensation so that the space vehicle 120 reaches the desired orbital position. An exemplary height could be 300,000 feet above the earth's surface, at which altitude atmospheric drag and heat from compression become relatively minor concerns. One skilled in the art can calculate the necessary height using these and any other factors based on conventional equations, and thus such calculations are not discussed in further detailed. The container can deploy a wing and/or parachute to guide the container to the earth's surface (step 435).

As will be appreciated from the description above, the use of the combination of a protective container 110 and maglev technology provides a particularly cost-effective way of launching space vehicles. Specifically, the protective container allows the space vehicle to be launched at a much higher speed at a much lower height from the earth's surface than conventional rocket technology because the protective container can withstand the greater atmospheric stresses that will be encountered. Furthermore, the additional weight of a protective container that can withstand the atmospheric stresses is significantly less than the additional fuel that is used in conventional rocket technology. Additionally, the overall design of the system is cheaper as the system is highly reusable so that the costs of the system can be amortized across a number of launches, whereas the expensive booster rockets of conventional rocket technology are typically used for a single launch.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A container, comprising:
   an outer shell comprising a material configured to withstand atmospheric stresses as the container passes through an atmosphere;
   an inner compartment configured to accommodate a space vehicle or a combination of a space vehicle and a rocket; and
   a deployable wing or parachute configured for deployment to guide the container back to a surface of the earth,
   wherein the outer shell is configured to open across a horizontal or vertical extent of the container so that the space vehicle or the combination of the space vehicle and the rocket are released from the inner compartment,
   wherein the container is configured to be launched from a surface of the earth,
   wherein the container is configured to release the space vehicle or the combination of the space vehicle and the rocket from the protective container once the protective container reaches a predetermined altitude above earth's surface, wherein the predetermined altitude is equal to or below 300,000 feet above the earth's surface.

2. The container of claim 1, wherein the material is steel.

3. The container of claim 1, further comprising:
   a nose cone containing a liquid or frozen liquid, wherein the nose cone is configured to release the liquid or frozen liquid.

4. A method, comprising:
   arranging a space vehicle or a combination of a space vehicle and a rocket in a protective container;
   arranging the protective container containing the space vehicle or the combination of the space vehicle and the rocket on a sled, wherein the sled is arranged above a magnetic levitation rail in a tunnel on a surface of the earth;
   accelerating the sled to a predetermined velocity;
   releasing the protective container containing the space vehicle or the combination of the space vehicle and the rocket in the protective container from the sled and the tunnel into the atmosphere;
   releasing the space vehicle or the combination of the space vehicle and the rocket from the protective container once the protective container reaches a predetermined altitude above earth's surface, wherein the predetermined altitude is equal to or below 300,000 feet above the earth's surface; and
   deploying a wing or parachute of the protective container to guide the protective container as it descends towards the earth's surface.

5. The method of claim 4, wherein the protective container includes a nose cone and the method further comprising:
   releasing a liquid or frozen liquid from the nose cone.

6. The method of claim 4, wherein the tunnel is maintained at a predetermined pressure.

7. The method of claim 6, wherein the predetermined pressure is maintained by arranging a protective film at a terminal end of the tunnel.

8. The method of claim 7, wherein the protective film comprises a plurality of protective films.

9. The method of claim 4, wherein the predetermined velocity is 10% of an orbital velocity of the space vehicle.

10. A system, comprising:
    a container that includes
       an outer shell comprising a material configured to withstand atmospheric stresses as the container passes through an atmosphere, and
       an inner compartment configured to accommodate a space vehicle or a combination of a space vehicle and a rocket;
    a magnetic levitation system configured to launch the container from a surface of the earth, wherein the magnetic levitation system includes
       a tunnel;
       a magnetic levitation rail; and
       a sled configured to levitate above the magnetic levitation rail,
    wherein the container is arranged on the sled, and the sled includes an acceleration mechanism configured to accelerate the container to a predetermined velocity,
    wherein the container includes a deployable wing or parachute configured for deployment to guide the container back to a surface of the earth,
    wherein the container is configured to release the space vehicle or the combination of the space vehicle and the rocket from the protective container once the protective container reaches a predetermined altitude above earth's surface, wherein the predetermined altitude is equal to or below 300,000 feet above the earth's surface.

11. The system of claim 10, wherein container is configured to open across a horizontal or vertical extent of the container so that the space vehicle or the combination of the space vehicle and the rocket are released from the inner compartment.

12. The system of claim 10, wherein the material of the container is steel.

13. The system of claim 10, wherein the container further comprises a nose cone containing a liquid or frozen liquid, wherein the nose cone is configured to release the liquid or frozen liquid.

14. The system of claim 10, further comprising:
    a protective film arranged at a terminal end of the tunnel in such a manner to maintain the tunnel at a predetermined pressure.

15. The system of claim 14, wherein the protective film comprises a plurality of protective films.

* * * * *